United States Patent [19]
Towner et al.

[11] Patent Number: 5,437,155
[45] Date of Patent: Aug. 1, 1995

[54] OUTBOARD MOTOR EXHAUST SYSTEM

[75] Inventors: Stephen J. Towner, Libertyville, Ill.; Joel C. Jahnke, Kenosha, Wis.; John A. Pierman; Robert L. Turk, both of Waukegan, Ill.

[73] Assignee: Outboard Marine Corporation, Waukegan, Ill.

[21] Appl. No.: 136,413

[22] Filed: Oct. 13, 1993

[51] Int. Cl.⁶ .............................................. F02B 27/02
[52] U.S. Cl. ........................................ 60/313; 60/314
[58] Field of Search ..................... 60/312, 313, 314; 123/52 M, 52 ML

[56] References Cited

U.S. PATENT DOCUMENTS

| | | | |
|---|---|---|---|
| 3,367,311 | 2/1968 | Tenney | 60/313 |
| 3,692,006 | 9/1972 | Miller et al. | 60/312 |
| 3,808,807 | 5/1974 | Lanpheer | 60/313 |
| 4,116,172 | 9/1978 | Lohr et al. | 60/313 |
| 4,342,195 | 8/1982 | Lo | 60/313 |
| 4,732,118 | 3/1988 | Tanahashi et al. | 60/314 |
| 4,732,124 | 3/1988 | Nakamura et al. | 60/314 |
| 4,800,720 | 1/1989 | Okada | 60/313 |
| 4,813,232 | 3/1989 | Hitomi | 60/313 |
| 4,835,965 | 6/1989 | Poehlman | 60/313 |
| 5,101,626 | 4/1992 | Blair | 60/313 |

*Primary Examiner*—Ira S. Lazarus
*Assistant Examiner*—Daniel J. O'Connor
*Attorney, Agent, or Firm*—Michael, Best & Friedrich

[57] ABSTRACT

An outboard motor comprising a lower unit including an outer housing and an inner exhaust housing mounted within the outer housing, the inner exhaust housing defining an exhaust chamber, the upper end of the inner exhaust housing having therein spaced first and second exhaust inlets, and the inner exhaust housing also including a first exhaust pipe having an upper end communicating with the first exhaust inlet and having a lower end communicating with the exhaust chamber, a second exhaust pipe having an upper end communicating with the second exhaust inlet and having a lower end communicating with the exhaust chamber, and a connecting exhaust pipe having opposite first and second ends respectively communicating with the first and second exhaust inlets, the connecting pipe being open only at the opposite ends, and a two-stroke internal combustion engine including first, second, third and fourth cylinders and first, second, third and fourth exhaust gas ducts having respective first ends communicating respectively with the first, second, third and fourth cylinders and having respective second ends, the second ends of the first and third ducts communicating with the first exhaust inlet, and the second ends of the second and fourth ducts communicating with the second exhaust inlet.

22 Claims, 1 Drawing Sheet

OUTBOARD MOTOR EXHAUST SYSTEM

BACKGROUND OF THE INVENTION

The invention relates to internal combustion engines and more particularly to two-stroke internal combustion engines. Still more particularly, the invention relates to exhaust systems for such engines, especially in outboard motors.

U.S. Pat. No. 5,101,626, which is assigned to the assignee hereof and which is incorporated herein by reference, discloses a two-stroke internal combustion engine including an exhaust gas discharge system which, for each cylinder, provides an outgoing positive acoustical pressure wave that arrives at the exhaust port of the previously fired cylinder prior to closure thereof and provides a returning negative acoustical pressure wave that travels in the exhaust system after substantial completion of the travel of the outgoing positive acoustical pressure wave and that arrives at the exhaust port of the originating cylinder prior to closure thereof.

SUMMARY OF THE INVENTION

The invention provides an outboard motor and a two-stroke internal combustion engine assembly incorporating at least some of the teachings of U.S. Pat. No. 5,101,626.

The outboard motor comprises a lower unit including an outer housing having an exhaust outlet adjacent the lower end of the outer housing. The lower unit also includes an inner exhaust housing within the outer housing. The inner exhaust housing defines an exhaust chamber, and the lower end of the inner exhaust housing has therein an exhaust outlet communicating between the exhaust chamber and the exhaust outlet of the outer housing. The upper end of the inner exhaust housing has therein spaced first and second exhaust inlets. The inner exhaust housing also includes: a first exhaust pipe or megaphone having an upper end communicating with the first exhaust inlet and having a lower end communicating with the exhaust chamber; a second exhaust pipe or megaphone having an upper end communicating with the second exhaust inlet and having a lower end communicating with the exhaust chamber; and a connecting exhaust pipe or crossover tube which is preferably U-shaped, which has opposite first and second ends respectively communicating with the first and second exhaust inlets, and which is open only at its opposite ends.

The outboard motor also comprises a two-stroke internal combustion engine mounted on the upper end of the outer housing. The engine is preferably a V-4 engine with first, second, third and fourth cylinders having respective first, second, third and fourth exhaust ports. The cylinders sequentially fire in the stated series. The engine also includes first, second, third and fourth exhaust gas ducts having respective first or upper ends communicating respectively with the first, second, third and fourth exhaust ports and having respective second or lower ends. The lower ends of the first and third ducts communicate with the first exhaust inlet in the inner exhaust housing, and the lower ends of the second and fourth ducts communicate with the second exhaust inlet in the inner exhaust housing. Thus, the first and third cylinders communicate via the first and third exhaust gas ducts with the first megaphone and with the first end of the crossover tube, and the second and fourth cylinders communicate via the second and fourth exhaust gas ducts with the second megaphone and with the second end of the crossover tube. The crossover tube therefore connects each cylinder with the previously fired cylinder.

Preferably, the first and second megaphones and the crossover tube are formed independently of each other such that any one of the megaphones and crossover tube can be reconfigured without changing the other two. This allows optimization of each via testing without affecting the others. Location of the megaphones and the crossover tube in the inner exhaust housing permits modification of the megaphones and the crossover tube with minimal changes to the overall outboard motor. Also, in the preferred embodiment of the invention, the flow length from the first exhaust port to the lower end of the first megaphone is substantially equal to the flow length from the second exhaust port to the lower end of the second megaphone, and the flow length from the third exhaust port to the lower end of the first megaphone is substantially equal to the flow length from the fourth exhaust port to the lower end of the second megaphone. Furthermore, the flow lengths via the crossover tube from each of the exhaust ports to the exhaust port of the previously fired cylinder are preferably unequal. The unequal flow lengths provide broad band tuning.

The exhaust system provides the outboard motor with increased low-end power for quick acceleration and with increased part-throttle running stability, due to the broad torque curve.

Other features and advantages of the invention will become apparent to those skilled in the art upon review of the following detailed description, claims and drawings.

Figure 1:
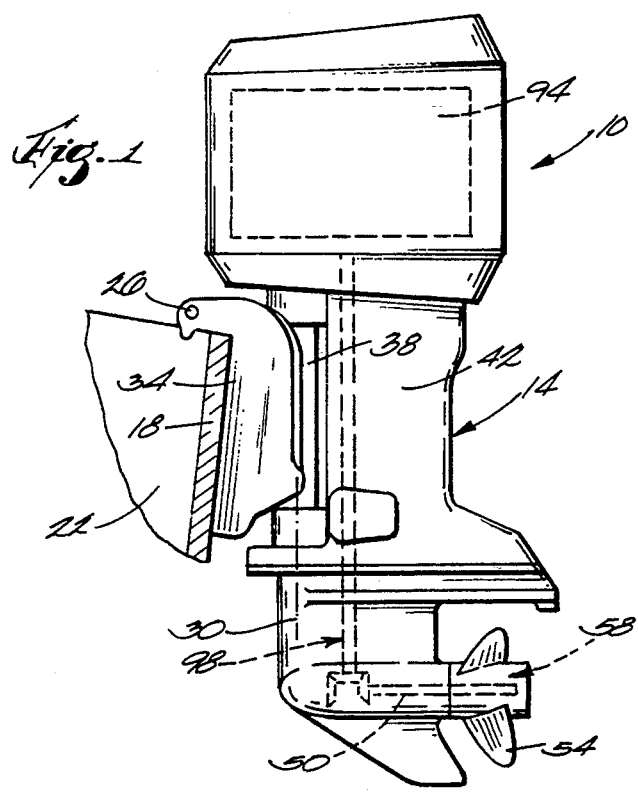
FIG. 1 is a side elevational view of an outboard motor embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An outboard motor 10 embodying the invention is illustrated in the drawings. The outboard motor 10 comprises (see FIG. 1) a lower unit 14 adapted to be mounted on the transom 18 of a boat 22 for pivotal movement relative thereto about a generally horizontal tilt axis 26 and for pivotal movement relative thereto about a generally vertical steering axis 30. The lower unit 14 is preferably mounted on the boat 22 by a transom bracket 34 and a swivel bracket 38. The transom bracket 34 and the swivel bracket 38 are conventional and will not be described in greater detail.

Figure 2:
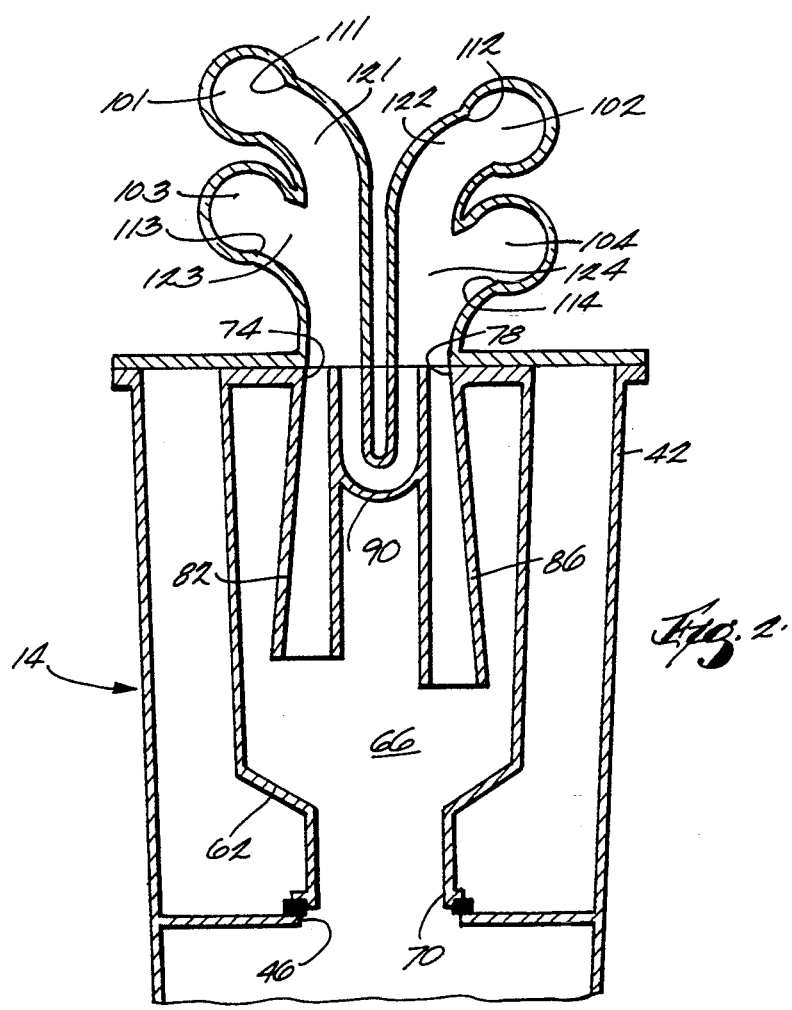
FIG. 2 is a partial, partially schematic, vertical sectional view of the outboard motor.

The lower unit 14 includes (see FIG. 2) an outer housing 42 having upper and lower ends and including an exhaust outlet 46 adjacent the lower end of the outer housing 42. A propeller shaft 50 (see FIG. 1) is rotatably supported by the outer housing 42 adjacent the lower end thereof. A propeller 54 is mounted on the propeller shaft 50 for rotation therewith. The propeller 54 preferably has therethrough an exhaust outlet passageway 58 as in known in the art. The exhaust outlet 46 communicates with the propeller exhaust outlet passageway 58.

The lower unit 14 also includes (see FIG. 2) an inner exhaust housing 62 mounted within the outer housing 42. The inner exhaust housing 62 has upper and lower ends and defines an exhaust chamber 66 extending between the upper and lower ends of the inner exhaust housing 62. The lower end of the inner exhaust housing 62 has therein an exhaust outlet 70 communicating between the exhaust chamber 66 and the exhaust outlet 46 of the outer housing 42. The exhaust chamber 66 thus communicates with the propeller exhaust outlet passageway 58. The upper end of the inner exhaust housing 62 has therein spaced first and second exhaust inlets 74 and 78, respectively. The inner exhaust housing 62 also includes a first downwardly-diverging exhaust pipe or megaphone 82 having an upper end communicating with the first exhaust inlet 74 and having a lower end communicating with the exhaust chamber 66. The inner exhaust housing 62 also includes a second downwardly-diverging exhaust pipe or megaphone 86 having an upper end communicating with the second exhaust inlet 78 and having a lower end communicating with the exhaust chamber 66. The inner exhaust housing 62 further includes a connecting exhaust pipe or crossover tube 90 having opposite first and second or (see FIG. 2) left and right ends respectively communicating with the first and second exhaust inlets 74 and In the illustrated construction, the upper end of the megaphone 82 and the left end of the crossover tube 90 define the exhaust inlet 74, and the upper end of the megaphone 86 and the right end of the crossover tube 90 define the exhaust inlet 78. Alternatively, the megaphones 82 and 86 and the crossover tube 90 could split a slight distance below the inlets 74 and 78. The crossover tube 90 is open only at its opposite ends.

The inner exhaust housing 62 is preferably made of metal, such as aluminum, and is cast as a single piece. Preferably, the megaphones 82 and 86 and the crossover tube 90 are formed independently of each other such that any one of the megaphones 82 and 86 and the crossover tube 90 can be reconfigured with changing the others of the megaphones 82 and 86 and the crossover tube 90.

The outboard motor 10 also comprises (see FIG. 1) a two-stroke internal combustion engine 94 (shown schematically in the drawings) having a lower end mounted on the upper end of the outer housing 42. The lower end of the engine 94 is also secured to the upper end of the inner housing 62 by suitable means (not shown). The engine 94 is drivingly connected to the propeller shaft 50 via a conventional drive train 98. The engine 94 is preferably a V-4 engine including (see FIG. 2) first, second, third and fourth cylinders 101, 102, 103 and 104, respectively, which sequentially fire in the stated series. The first and third cylinders 101 and 103 are located in one cylinder bank, and the second and fourth cylinders 102 and 104 are located in the other cylinder bank. The cylinders 101, 102, 103 and 104 preferably fire at an even firing interval of ninety degrees. It should be understood, however, that the invention is also applicable to two-stroke internal combustion engines having different numbers of cylinders, different firing intervals and different configurations.

The cylinders 101, 102, 103 and 104 include respective first, second, third and fourth exhaust ports 111, 112, 113 and 114. The engine 94 also includes first, second, third and fourth exhaust gas ducts 121, 122, 123 and 124 having respective first or upper ends communicating respectively with the exhaust ports 111, 112, 113 and 114 and having respective second or lower ends. The lower ends of the first and third ducts 121 and 123 communicate with the first exhaust inlet 74 in the inner housing and the lower ends of the second and fourth ducts 122 and 124 communicate with the second exhaust inlet 78 in the inner housing. In the illustrated construction, the ducts 121 and 123 actually merge into a single duct that communicates with the exhaust inlet 74, and the ducts 122 and 124 actually merge into a single duct that communicates with the exhaust inlet 78. Thus, the first and third exhaust ports 111 and 113 communicate with the megaphone 82 and with the left end of the crossover tube 90 and the second and the fourth exhaust ports 112 and 114 communicate with the megaphone 86 and with the right end of the crossover tube 90.

The flow length from the first exhaust port 111 to the lower end of the megaphone 82 is preferably substantially equal to the flow length from the second exhaust port 112 to the lower end of the megaphone 86, and the flow length from the third exhaust port 113 to the lower end of the megaphone 82 is preferably substantially equal to the flow length from the fourth exhaust port 114 to the lower end of the megaphone 86. Also, in the preferred embodiment, the flow lengths via the crossover tube 90 from each of the exhaust ports 111, 112, 113 and 114 to the exhaust port of the previously fired cylinder are not equal. Instead, these flow lengths are selected to provide broad band tuning. The actual flow lengths must be determined on a case-by-case basis. One of ordinary skill in the art can easily do this following the teachings of this application and of U.S. Pat. No. 5,101,626. It should be understood that some of these flow lengths (via the crossover tube 90) could alternatively be equal, depending on the tuning characteristics of a particular outboard motor.

The exhaust gas ducts 121, 122, 123 and 124 should have sufficient cross-sectional area so as not to restrict flow but should be small enough to retain satisfactory sonic pulse energy for good exhaust port plugging as described in U.S. Pat. No. 5,101,626.

During operation of the outboard motor 10, each megaphone 82 or 86 allows exhaust gas from the engine 94 to exit into the atmosphere. Also, when the expanding acoustical pulse from an originating cylinder reaches the lower end of the associated megaphone, the pulse reflects back to the originating exhaust port as a negative pressure wave that assists in scavenging. The acoustical pulse created by the blow-down cycle of the originating cylinder travels in the crossover tube 90 and, with a high degree of energy retention, enters the other bank of cylinders where the pulse plugs the exhaust port of the previously fired cylinder.

Except for any differences described above, the exhaust system of the outboard motor 10 operates in the same manner as the exhaust system disclosed in U.S. Pat. No. 5,101,626.

Various features of the invention are set forth in the following claims.

We claim:

1. An outboard motor comprising
a lower unit adapted to be mounted on the transom of a boat for pivotal movement relative thereto about a generally horizontal tilt axis and for pivotal movement relative thereto about a generally vertical steering axis, said lower unit including an outer housing having upper and lower ends and an exhaust outlet adjacent said lower end, and an inner exhaust housing mounted within said outer housing, said inner exhaust housing having upper and lower ends and defining an exhaust chamber extending between said upper and lower ends of said inner exhaust housing, said lower end of said inner exhaust housing having therein an exhaust outlet communicating between said exhaust chamber and said exhaust outlet of said outer housing, said upper end of said inner exhaust housing having therein spaced first and second exhaust inlets, and said inner exhaust housing also including a first exhaust pipe having an upper end communicating with said first exhaust inlet and having a lower end communicating with said exhaust chamber, a second exhaust pipe having an upper end communicating with said second exhaust inlet and having a lower end communicating with said exhaust chamber, and a connecting exhaust pipe having opposite first and second ends respectively communicating with said first and second exhaust inlets,
a propeller shaft rotatably supported by said outer housing adjacent said lower end of said outer housing, and
a two-stroke internal combustion engine mounted on said upper end of said outer housing, said engine being drivingly connected to said propeller shaft, and said engine including first and second cylinders having respective first and second exhaust ports, and first and second exhaust gas ducts having respective first ends communicating respectively with said first and second exhaust ports and having respective second ends communicating respectively with said first and second exhaust inlets.

2. An outboard motor as set forth in claim 1 wherein the flow length from said first exhaust port to said lower end of said first exhaust pipe is substantially equal to the flow length from said second exhaust port to said lower end of said second exhaust pipe.

3. An outboard motor as set forth in claim 1 wherein said first and second exhaust pipes and said connecting pipe are formed independently of each other such that any one of said first and second exhaust pipes and said connecting pipe can be reconfigured without changing the others of said first and second exhaust pipes and said connecting pipe.

4. An outboard motor as set forth in claim 1 wherein said inner exhaust housing has a one-piece construction.

5. An outboard motor as set forth in claim 1 wherein said connecting exhaust pipe is open only at said opposite ends.

6. An outboard motor as set forth in claim 1 wherein said engine further includes third and fourth cylinders having respective third and fourth exhaust ports, and wherein said first ends of said first and second exhaust gas ducts communicate respectively with said third and fourth exhaust ports.

7. An outboard motor comprising
a lower unit adapted to be mounted on the transom of a boat for pivotal movement relative thereto about a generally horizontal tilt axis and for pivotal movement relative thereto about a generally vertical steering axis, said lower unit having upper and lower ends, said lower end of said lower unit having therein an exhaust outlet, said upper end of said lower unit having therein spaced first and second exhaust inlets, and said lower unit also including a first exhaust pipe having an upper end communicating with said first exhaust inlet and having a lower end communicating with said exhaust outlet, a second exhaust pipe having an upper end communicating with said second exhaust inlet and having a lower end communicating with said exhaust outlet, and a connecting exhaust pipe having opposite first and second ends respectively communicating with said first and second exhaust inlets, said first and second exhaust pipes and said connecting pipe being formed independently of each other such that any one of said first and second exhaust pipes and said connecting pipe can be reconfigured without changing the others of said first and second exhaust pipes and said connecting pipe,
a propeller shaft rotatably supported by said lower unit adjacent said lower end of said lower unit, and
a two-stroke internal combustion engine mounted on said upper end of said lower unit, said engine being drivingly connected to said propeller shaft, and said engine including first and second cylinders having respective first and second exhaust ports, and first and second exhaust gas ducts having respective first ends communicating respectively with said first and second exhaust ports and having respective second ends communicating respectively with said first and second exhaust inlets.

8. An outboard motor as set forth in claim 7 wherein the flow length from said first exhaust port to said lower end of said first exhaust pipe is substantially equal to the flow length from said second exhaust port to said lower end of said second exhaust pipe.

9. An outboard motor as set forth in claim 7 wherein said connecting exhaust pipe is open only at said opposite ends.

10. An outboard motor as set forth in claim 7 wherein said engine further includes third and fourth cylinders having respective third and fourth exhaust ports, and wherein said first ends of said first and second exhaust gas ducts communicate respectively with said third and fourth exhaust ports.

11. An outboard motor comprising
a lower unit adapted to be mounted on the transom of a boat for pivotal movement relative thereto about a generally horizontal tilt axis and for pivotal movement relative thereto about a generally vertical steering axis, said lower unit having upper and lower ends, said lower end of said lower unit having therein an exhaust outlet, said upper end of said lower unit having therein spaced first and second exhaust inlets, and said lower unit also including a first exhaust pipe having an upper end communicating with said first exhaust inlet and having a lower end communicating with said exhaust outlet, a second exhaust pipe having an upper end communicating with said second exhaust inlet and having a lower end communicating with said exhaust outlet, and a connecting exhaust pipe having opposite first and second ends respectively communicating with said first and second exhaust inlets,
a propeller shaft rotatably supported by said lower unit adjacent said lower end of said lower unit, and a two-stroke internal combustion engine mounted on said upper end of said lower unit, said engine being drivingly connected to said propeller shaft, and said engine including first, second, third and fourth cylinders which sequentially fire in the stated series and which include respective first, second, third and fourth exhaust ports, and first, second, third and fourth exhaust gas ducts having respective first ends communicating respectively with said first, second, third and fourth exhaust ports and having respective second ends, said second ends of said first and third ducts communicating with said first exhaust inlet, and said second ends of said second and fourth ducts communicating with said second exhaust inlet, the flow lengths via said connecting pipe from each of said exhaust ports to the exhaust port of the previously fired cylinder being unequal.

12. An outboard motor as set forth in claim 11 wherein the flow length from said first exhaust port to said lower end of said first exhaust pipe is substantially equal to the flow length from said second exhaust port to said lower end of said second exhaust pipe, and the flow length from said third exhaust port to said lower end of said first exhaust pipe is substantially equal to the flow length from said fourth exhaust port to said lower end of said second exhaust pipe.

13. An outboard motor as set forth in claim 11 wherein said first and second exhaust pipes and said connecting pipe are formed independently of each other such that any one of said first and second exhaust pipes and said connecting pipe can be reconfigured without changing the others of said first and second exhaust pipes and said connecting pipe.

14. An outboard motor as set forth in claim 11 wherein said connecting exhaust pipe is open only at said opposite ends.

15. A two-stroke internal combustion engine assembly comprising an engine block including an outer surface, first and second cylinders having respective first and second exhaust ports, first and second exhaust gas ducts having respective first ends communicating respectively with said first and second exhaust ports and having respective second ends located in said outer surface, and a housing member connected to said outer surface and including a first exhaust pipe having an first end communicating with said second end of said first duct and having a second end communicating with the atmosphere, a second exhaust pipe having an first end communicating with said second end of said second duct and having a second end communicating with the atmosphere, and a connecting exhaust pipe having opposite first and second ends respectively communicating with said second ends of said first and second ducts and respectively communicating with said first ends of said first and second pipes, said first and second exhaust pipes and said connecting pipe being formed independently of each other such that only one of said first and second exhaust pipes and said connecting pipe can be reconfigured without changing the others of said first and second exhaust pipes and said connecting pipe.

16. An assembly as set forth in claim 15 wherein the flow length from said first exhaust port to said second end of said first exhaust pipe is substantially equal to the flow length from said second exhaust port to said second end of said second exhaust pipe.

17. An assembly as set forth in claim 16 wherein said connecting exhaust pipe is open only at said opposite ends.

18. A two-stroke internal combustion engine assembly comprising first, second, third and fourth cylinders which sequentially fire in the stated series and which include respective first, second, third and fourth exhaust ports, first, second, third and fourth exhaust gas ducts having respective first ends communicating respectively with said first, second, third and fourth exhaust ports and having respective second ends, a first exhaust pipe having a first end communicating with said second ends of said first and third ducts and having a second end communicating with the atmosphere, a second exhaust pipe having a first end communicating with said second ends of said second and fourth ducts and having a second end communicating with the atmosphere, and a connecting exhaust pipe having opposite first and second ends, said first end of said connecting pipe communicating with said second ends of said first and third ducts and with said first end of said first pipe, said second end of said connecting pipe communicating with said second ends of said second and fourth ducts and with said first end of said second pipe, and the flow lengths via said connecting pipe from each of said exhaust ports to the exhaust port of the previously fired cylinder being unequal.

19. An assembly as set forth in claim 18 wherein said connecting exhaust pipe is open only at said opposite ends.

20. An assembly as set forth in claim 18 wherein the flow length from said first exhaust port to said second end of said first exhaust pipe is substantially equal to the flow length from said second exhaust port to said second end of said second exhaust pipe, and the flow length from said third exhaust port to said second end of said first exhaust pipe is substantially equal to the flow length from said fourth exhaust port to said second end of said second exhaust pipe.

21. An assembly as set forth in claim 18 wherein said first and second exhaust pipes and said connecting pipe are formed independently of each other such that any one of said first and second exhaust pipes and said connecting pipe can be reconfigured without changing the others of said first and second exhaust pipes and said connecting pipe.

22. An outboard motor comprising
a lower unit adapted to be mounted on the transom of a boat for pivotal movement relative thereto about a generally horizontal tilt axis and for pivotal movement relative thereto about a generally vertical steering axis, said lower unit including an outer housing having upper and lower ends and an exhaust outlet adjacent said lower end, and a one-piece inner exhaust housing mounted within said outer housing, said inner exhaust housing having upper and lower ends and defining an exhaust chamber extending between said upper and lower ends of said inner exhaust housing, said lower end of said inner exhaust housing having therein an exhaust outlet communicating between said exhaust chamber and said exhaust outlet of said outer housing, said upper end of said inner exhaust housing having therein spaced first and second exhaust inlets, and said inner exhaust housing also including a first exhaust pipe having an upper end communicating with said first exhaust inlet and having a lower end communicating with said exhaust chamber, a second exhaust pipe having an upper end communicating with said second exhaust inlet and having a lower end communicating with said exhaust chamber, and a connecting exhaust pipe having opposite first and second ends respectively communicating with said first and second exhaust inlets, said connecting pipe being open only at said opposite ends, said first and second exhaust pipes and said connecting pipe being formed independently of each other such that any one of said first and second exhaust pipes and said connecting pipe can be reconfigured without changing the others of said first and second exhaust pipes and said connecting pipe, a propeller shaft rotatably supported by said outer housing adjacent said lower end of said outer housing, and a two-stroke internal combustion engine mounted on said upper end of said outer housing, said engine being drivingly connected to said propeller shaft, and said engine including first, second, third and fourth cylinders which sequentially fire in the stated series and which include respective first, second, third and fourth exhaust ports, and first, second, third and fourth exhaust gas ducts having respective first ends communicating respectively with said first, second, third and fourth exhaust ports and having respective second ends, said second ends of said first and third ducts communicating with said first exhaust inlet, and said second ends of said second and fourth ducts communicating with said second exhaust inlet, the flow length from said first exhaust port to said lower end of said first exhaust pipe being substantially equal to the flow length from said second exhaust port to said lower end of said second exhaust pipe, the flow length from said third exhaust port to said lower end of said first exhaust pipe being substantially equal to the flow length from said fourth exhaust port to said lower end of said second exhaust pipe, and the flow lengths via said connecting pipe from each of said exhaust ports to the exhaust port of the previously fired cylinder being unequal.

* * * * *